US011767762B2

(12) United States Patent
Murdoch

(10) Patent No.: US 11,767,762 B2
(45) Date of Patent: Sep. 26, 2023

(54) ROTOR FOR AN ELECTRICITY GENERATOR

(71) Applicant: MAKO TURBINES PTY. LTD., Alexandria (AU)

(72) Inventor: Peter John Murdoch, Duffys Forest (AU)

(73) Assignee: FREEFLOW ENERGY PTY LIMITED, Sydney (AU)

( * ) Notice: Subject to any disclaimer, the term of this patent is extended or adjusted under 35 U.S.C. 154(b) by 0 days.

(21) Appl. No.: 17/078,049

(22) Filed: Oct. 22, 2020

(65) Prior Publication Data

US 2021/0040857 A1 Feb. 11, 2021

Related U.S. Application Data

(63) Continuation of application No. 15/558,922, filed as application No. PCT/AU2016/000091 on Mar. 16, 2016, now abandoned.

(30) Foreign Application Priority Data

Mar. 17, 2015 (AU) ................................ 2015900950

(51) Int. Cl.
*F03B 3/04* (2006.01)
*F01D 5/14* (2006.01)
(Continued)

(52) U.S. Cl.
CPC .............. *F01D 5/147* (2013.01); *F01D 5/02* (2013.01); *F03B 3/04* (2013.01); *F03B 13/10* (2013.01);
(Continued)

(58) Field of Classification Search
CPC .......... F03B 3/04; F03B 13/10; F03B 13/264; F03B 17/061; F05B 2220/32; F05B 2250/00

See application file for complete search history.

(56) References Cited

U.S. PATENT DOCUMENTS 2,068,792 A * 1/1937 Dekker ................... B64C 11/00
  416/244 R
5,137,417 A * 8/1992 Lund ......................... F03D 1/06
  415/908

(Continued)

FOREIGN PATENT DOCUMENTS

WO WO-2007125349 A2 * 11/2007 .............. F03B 11/06

OTHER PUBLICATIONS

European Patent Office, Communication pursuant to Article 94(3) EPC, Application No. 16 764 053.1-1002, dated Jul. 8, 2021, Mako Tidal Turbines Pty Ltd.

*Primary Examiner* — Courtney D Heinle
*Assistant Examiner* — Danielle M. Christensen
(74) *Attorney, Agent, or Firm* — Orbit IP, LLP

(57) ABSTRACT

A rotor (10) for a hydro-powered electricity generator. The rotor (10) includes a hub (12) and a plurality of blades (16). The hub (12) has a circular cross sectional shape and a longitudinal rotational axis (14). The plurality of blades (16) each have proximal root (16a) and a distal tip (16b). Each of the blade roots (16a) are mounted to the hub (12) at the widest part thereof (D1). The ratio between the diameter of the tips (16b) of the blades to the diameter of the widest part (D1) of the hub (12) is less than about 2:1.

15 Claims, 3 Drawing Sheets

(51) Int. Cl.
*F03B 13/10* (2006.01)
*F03B 17/06* (2006.01)
*F03B 13/26* (2006.01)
*F01D 5/02* (2006.01)

(52) U.S. Cl.
CPC .......... *F03B 13/264* (2013.01); *F03B 17/061* (2013.01); *F05B 2220/32* (2013.01); *F05B 2250/00* (2013.01); *Y02E 10/20* (2013.01)

(56) References Cited

U.S. PATENT DOCUMENTS

| | | | |
|---|---|---|---|
| 2008/0138206 A1* | 6/2008 | Corren | F03B 3/121 416/223 R |
| 2011/0070083 A1 | 3/2011 | Murtonen | |
| 2016/0186713 A1* | 6/2016 | Murdoch | F03B 3/06 416/162 |

* cited by examiner

ROTOR FOR AN ELECTRICITY GENERATOR

CROSS REFERENCE TO RELATED APPLICATIONS

This Application is a continuation of U.S. patent application Ser. No. 15/558,922, filed Sep. 15, 2017, a National Stage Entry of PCT/AU2016/000091, filed Mar. 16, 2016, the contents of both are herein incorporated by reference in their entireties.

FIELD OF THE INVENTION

The present invention relates to a rotor for an electricity generator.

The invention has been primarily developed for use in a rotor for a hydro-powered electricity generator. Such generators are used to convert kinetic energy from flowing fluids, such as water and wind, to electrical power.

BACKGROUND OF THE INVENTION

Kinetic energy in flowing fluids, such as water and wind, is a known alternative to energy sources such as bio-fuels and fossil fuels for generating power. Unlike, for example, bio- and fossil fuels which, when used in electrical power generation, go hand-in-hand with emission of harmful combustion gasses into the atmosphere, generation of power by using flowing fluids has no or very little adverse effects on the atmosphere.

Known installations for harvesting wind power generally have low running costs, however they tend to be expensive to install and have relatively low generation capacity. Known installations for harvesting hydropower, for example tidal power, on the other hand, have relatively higher generation capacity.

Known hydro-powered electricity generators typically have a rotor comprising a central hub to which is attached two or more outwardly extending blades. The rotor is connected by a drive shaft to a rotary work to electrical power converter (i.e. a generator). Fluid flowing past the rotor blades causes it to rotate which in turn causes the rotation in the converter and the generation of electrical power.

Known rotors have a relatively small diameter hub and relatively long and slender blades. The blades also have a relatively high aspect ratio (being the ratio of the blade length to the blade width). Such blades are prone to high operating loads and subject to extreme bending moments in turbulent fluid flow. This typically results in broken blades.

OBJECT OF THE INVENTION

It is an object of the present invention to substantially overcome, or at least ameliorate, the above disadvantage.

SUMMARY OF THE INVENTION

In a first aspect, the present invention provides a rotor for a hydro-powered electricity generator, the rotor including:
a hub with a circular cross-sectional shape and a longitudinal rotational axis,
a plurality of blades, each having a proximal root and a distal tip, each of the blade roots being mounted to the hub at the widest part thereof,
wherein the ratio between the diameter of the tips of the blades to the diameter of the widest part of the hub is less than about 2:1.

Preferably, the ratio between the diameter of the tips of the blades to the diameter of the widest part of the hub is between about 1.2:1 and 2:1.

Preferably, the ratio between the diameter of the tips of the blades to the diameter of the widest part of the hub is about 1.5:1 or 1.6:1.

In one embodiment, the diameter of the tips of the blades is between 3.6 and 4.8 metres and the diameter of the widest part of the hub is 2.4 metres.

In another embodiment, the diameter of the tips of the blades is between 30 and 32 metres and the diameter of the widest part of the hub is 20 metres.

The profile radius of the hub surface, in the region where each of the blade roots are mounted to the hub, is preferably between I/6th of and equal to the radius of the widest part of the hub.

BRIEF DESCRIPTION OF THE DRAWINGS

Preferred embodiments of the invention will now be described, by way of examples only, with reference to the accompanying drawings in which.

DETAILED DESCRIPTION OF THE PREFERRED EMBODIMENTS

Figure 1:
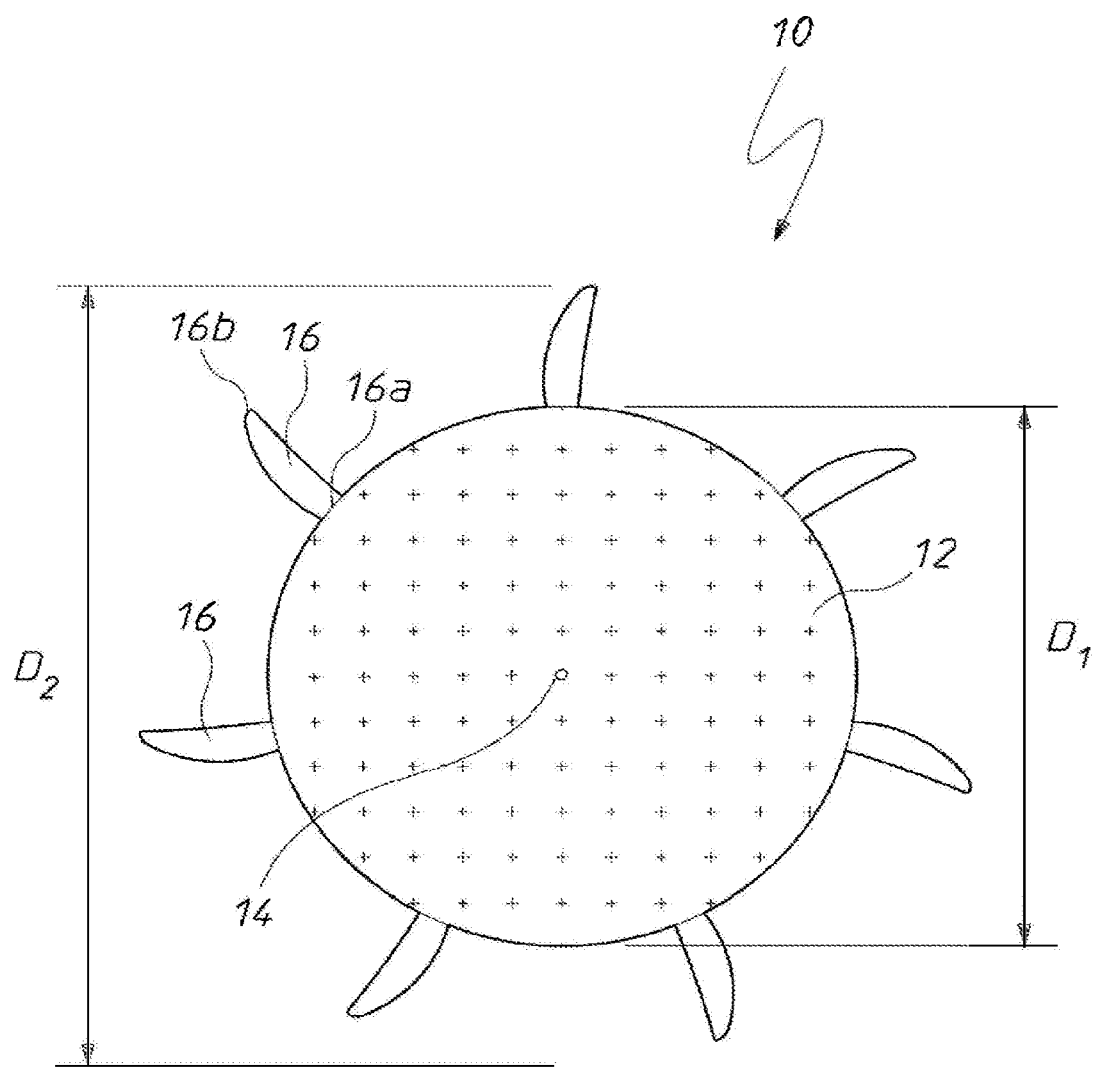
FIG. 1 is a front view of a first embodiment of a rotor.
Figure 2:
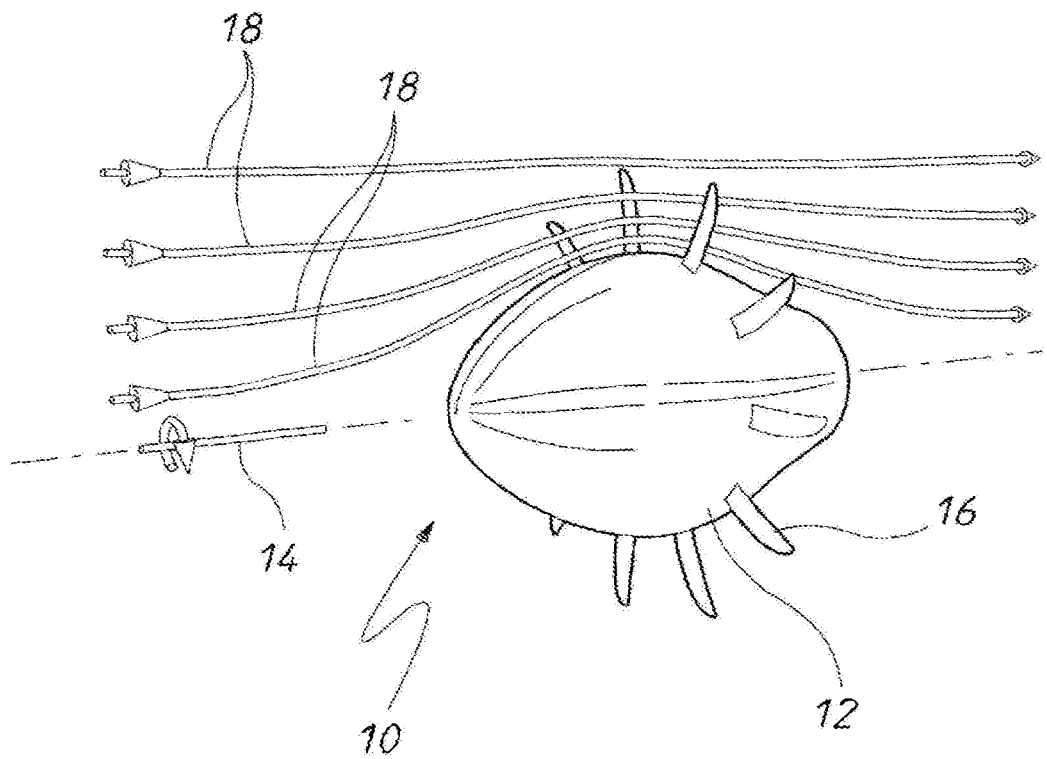
FIG. 2 is a perspective view of the rotor shown in FIG. 1 with stream lines.

FIGS. 1 and 2 show a rotor 10 for a hydro-powered electricity generator suitable for installation in a tidal flow environment. The rotor 10 includes a hub 12 with a circular cross-sectional shape and a longitudinal rotational axis 14. The rotor 10 also includes 7 equiangularly spaced apart blades 16. The hub 10 is formed from glass reinforced plastic (GRP) or metal skins and the blades 16 are formed from carbon fibre metal composites.

Each of the blades 16 has a proximal root 16a and distal tip 16b. Each of the blades 16 are mounted to the hub 14, at their roots 16a, at the widest part of the hub 14. The diameter of the widest part of the hub 14 is shown as diameter D1. The diameter of the tips 16b of the blades 16 is shown as diameter D2. In the embodiment shown, the ratio between diameters D2:D1 is about 1.4:1.

FIG. 2 shows the rotor 10 relative to fluid flow stream lines 18 which demonstrate that as the fluid flows around the hub 12 its velocity increases. As the fluid accelerates and the local velocity increases, the local pressure decreases. This pressure reduction causes the fluid to remain concentrated around the hub 12. As a result, the energy in a free stream of the fluid is concentrated in the region of the blades 16.

Another way of describing the above D2:D1 ratio is that the diameter of the hub 12 is relatively large compared to the length of the blades 16. The relatively large hub diameter DI advantageously serves the dual function of: 1. concentrating the energy in the passing water stream; and 2 supporting a relatively greater number of smaller and stronger blades 16, which each have a lower aspect ratio.

In relation to the latter issue, the bending moment at the root is a function of the aspect ratio of the blade. For example, a blade with an aspect ratio of 8:1 will have a stress value in the root that is 16 times higher than the same blade with an aspect ratio of 4:1. In a known 3-blade rotor with a relatively small diameter hub, the blades can only have a limited chord length at the root due to the diameter restriction of the hub. This restriction of chord length means that the blade root thickness must be increased, to provide sufficient strength, over that otherwise required for an ideal foil section.

A relatively longer blade mounted to a relatively smaller hub also results in a lower apparent velocity for a given RPM and a lower torque radius.

A thicker root, especially in the lower $\frac{1}{3}^{rd}$ of the blade, combined with the lower apparent velocity and the lower torque radius, results in a lowered contribution to the total power of such a (known) 3-blade rotor. This is due to the fact that the outer $\frac{1}{3}^{rd}$ of the blade in the smaller hub/larger 3-blade configuration does 63% of the work. This is a combination of the swept area of the outer 30% of the blade, which constitutes 56% of the total surface area, and the inner 30% of the blade producing negligible power.

In contrast, the configuration of the rotor 10 (i.e. relatively larger hub 14, relatively shorter blades 16, relatively large number of blades 16) redirects and concentrates the fluid flow in the inner ⅔ region and accelerates it through the outer $\frac{1}{3}_{rd}$ region where 100% of the power can be extracted. This advantageously means that the blades 16 are operating at maximum capacity, while also experiencing a lower stress loading.

Put another way, the D2:D1 ratio of the rotor 10 places the blades 16 in a zone of acceleration around the hub 12 with an ideal blade length for the blades 16 to operate in that zone. If the blades are too long relative to the hub diameter then the blades tips instead operate in a region with no fluid acceleration and therefore do not contribute positive torque.

Figure 3:
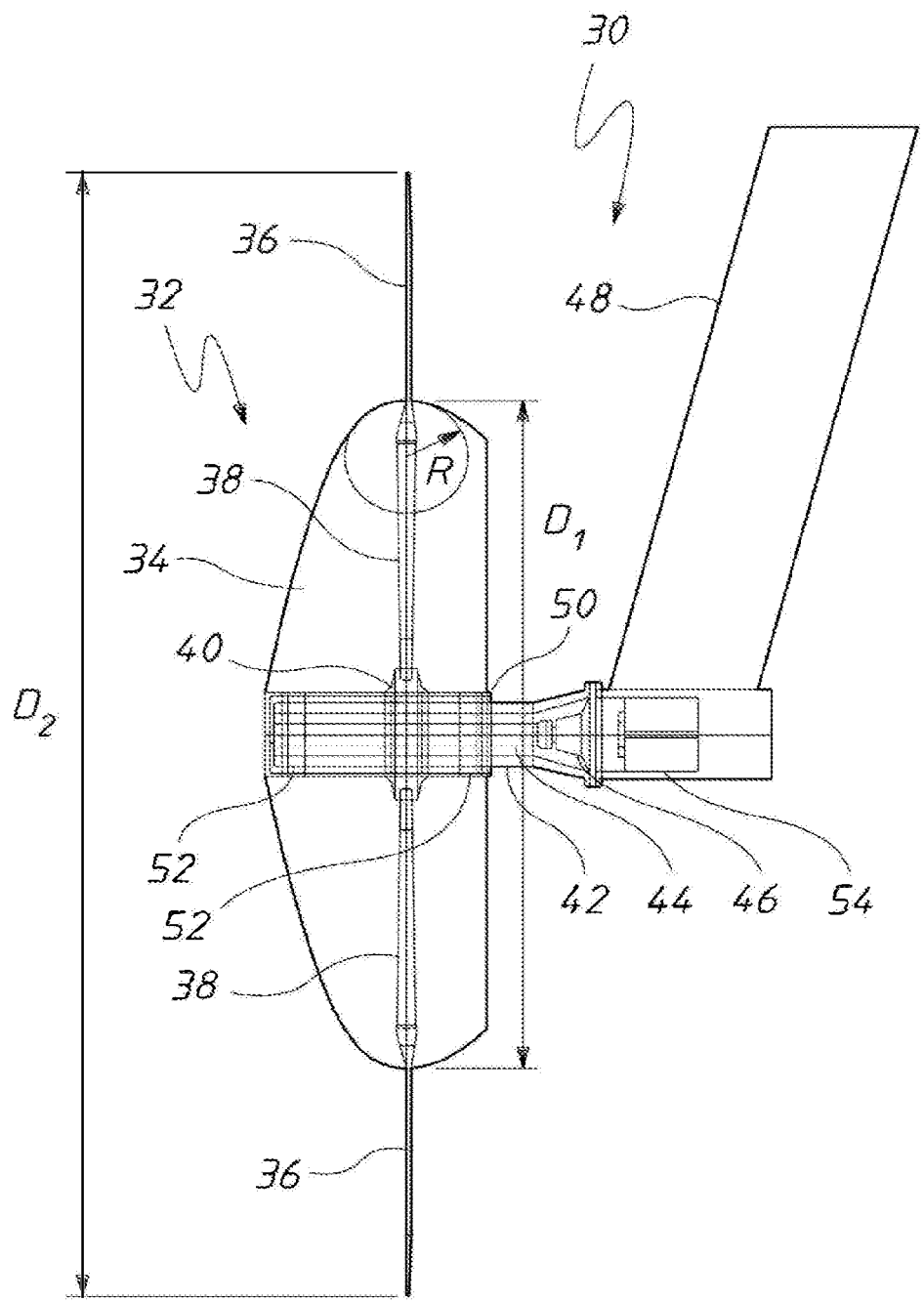
FIG. 3 is cross sectional side view of a hydro-powered electricity generator with a second embodiment of a rotor.

FIG. 3 shows a hydro-powered electricity generator 30 with a second embodiment of rotor 32. The rotor 32 has a hub 34 and ten blades 36. FIG. 3 also shows blade root mounting beams 38, a blade mounting hub 40, a fixed main spindle 42, a drive shaft 44, a gear box 46, a support beam 48, a water seal 50, bearings 52 and a rotary electrical generator 54. The beam 48 is used to connect the generator 30 to a floating deployment rig (not shown).

Also shown on FIG. 3 is radius R, being the profile radius hub 34 in the region where the hub 34 and the blades 36 are connected. In the preferred configuration shown, the radius R is ⅙ the radius of the hub 34. This particular ratio maximises flow acceleration while avoiding turbulence.

One preferred form of the generator 30 has the following specifications:
Hub diameter D1: 2.4 meters
Blade tip diameter D2: 4.8 to 3.6 meters
Power generation range: 50 to 300 kWs
Flow velocity range: 1.2 to 4.2 m/sec
Blade tip diameter to hub diameter ratio: 2:1 to 1.5:1
Another preferred form of the generator 30 has the following specifications:
Hub diameter D1: 20 meters
Blade tip diameter D2: 32 to 30 meters
Power generation range: 0.5 to 5 MWs
Flow velocity range: 1.2 to 4.0 m/sec
Blade tip diameter to hub diameter ratio: 1.6:1 to 1.5:1

There are several advantages for hydro-powered generators due to the (relatively larger) diameter hub to (relatively smaller) diameter blade ratios described above.

Firstly, the energy in the fluid stream is concentrated and accelerated across a set of small blades, which improves the efficiency of the rotor.

Secondly, the total volume of the multiple (e.g. 7) smaller blades is less than the volume of a small number of (e.g. 3) large blades, which lowers manufacturing cost.

Thirdly, the smaller blades have a lower aspect ratio, which equates to a lower bending moment in the blade root, and a lower probability of blade breakage.

Fourthly, the incident velocity and the incident angle of the flow onto the smaller blades is closer to a uniform value across the span of the blades. This equates to near zero twist in the blade across its span, and allows the blades to be articulated in pitch control without any performance losses induced by blade twist. Further, the ability to adjust the pitch during operation means the rotor can be run at a constant rpm independent of the flow stream velocity. This allows the generator to be run at a constant rpm connected directly to the electrical grid thereby negating the cost of an electrical frequency inverter drive system.

Fifthly, rotors operating in fast flowing tidal flows are subject to high levels of turbulence in the stream. The action of the flow acceleration of the water around the larger hub reduces the level of turbulence into the blade region. This improves the survivability of the blades in highly turbulence environments.

Although the invention has been described with reference to preferred embodiments, it will be appreciated by person skilled in the art that the invention may be embodied in other forms.

What is claimed is:

1. A rotor for a hydro-powered electricity generator suitable for installation in a free stream, the rotor including:
   a hub formed of a shape with a circular cross section and a longitudinal rotational axis, wherein the circular cross section increases in radius from a front of the hub to a maximum radius and decreasing in radius from the maximum radius to a back of the hub;
   a plurality of blades protruding out around the hub at the maximum radius wherein each blade in the plurality of blades has a proximal root and a distal tip and each blade in the plurality of blades protrudes from the hub at the proximal root;
   wherein each blade in the plurality of blades is tapered, such that each blade in the plurality of blades is widest at the proximal root and narrowest at the distal tip; and
   wherein the ratio of a blade tip diameter to a hub diameter is less than 2:1 and
   wherein a profile radius of the hub between the blade and the back of the hub is ⅙ of the maximum radius.

2. The rotor as claimed in claim 1, wherein allowing articulation of pitch during operation permits the rotor to run at a constant revolution per minute rate irrespective of stream flow velocity.

3. The rotor as claimed in claim 2, connected directly to an electrical grid.

4. The rotor as claimed in claim 3, which excludes an electrical frequency inverter drive system.

5. The rotor as claimed in claim 1, wherein each blade in the plurality of blades is attached to a blade mounting hub by a root mounting beam that is inside the hub.

6. The rotor as claimed in claim 1, wherein the ratio of blade tip diameter to hub diameter is 1.4:1.

7. The rotor as claimed in claim 1, wherein the ratio of blade tip diameter to hub diameter is between 2:1 and 1.5:1.

8. The rotor as claimed in claim 1, wherein the ratio of blade tip diameter to hub diameter is between 1.6:1 and 1.5:1.

9. A rotor for a hydro-powered electricity generator suitable for installation in a free stream, the rotor including:

a root mounting hub;

a hub that surrounds the root mounting hub and has a circular cross section and a longitudinal rotational axis, wherein the circular cross section increases in radius from a front of the hub to a maximum radius and decreasing in radius from the maximum radius to a back of the hub;

a plurality of root mounting beams attached to the root mounting hub and extending out from the root mounting hub towards an outer edge of the hub at the maximum radius; and a plurality of blades protruding out around the hub at the maximum radius wherein each blade in the plurality of blades has a proximal root and a distal tip and each blade in the plurality of blades is coupled to a root mounting beam from the plurality of root mounting beams and protrudes from the hub at the proximal root;

wherein each blade in the plurality of blades is tapered, such that each blade in the plurality of blades is widest at the proximal root and narrowest at the distal tip, and wherein the ratio of a blade tip diameter to a hub diameter is less than 2:1, and wherein a profile radius of the hub between the blade and the back of the hub is ⅙ of the maximum radius.

10. The rotor as claimed in claim 9, wherein allowing articulation of pitch during operation permits the rotor to run at a constant revolution per minute rate irrespective of stream flow velocity.

11. The rotor as claimed in claim 10, connected directly to an electrical grid.

12. The rotor as claimed in claim 11, which excludes an electrical frequency inverter drive system.

13. The rotor as claimed in claim 9, wherein the ratio of blade tip diameter to hub diameter is 1.4:1.

14. The rotor as claimed in claim 9, wherein the ratio of blade tip diameter to hub diameter is between 2:1 and 1.5:1.

15. The rotor as claimed in claim 9, wherein the ratio of blade tip diameter to hub diameter is between 1.6:1 and 1.5:1.

* * * * *